(12) United States Patent
Reverso

(10) Patent No.: US 6,664,100 B2
(45) Date of Patent: *Dec. 16, 2003

(54) CONVERSION OF ORGANIC WASTE INTO HUMIC PRODUCTS USING MULTIPLE AEROBIC FERMENTATIONS FOR SOILS RESTORATION

(76) Inventor: Riccardo Reverso, Via Mazzoni, 4, 15100 Alessandria (IT)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 289 days.

(21) Appl. No.: 09/257,011

(22) Filed: Feb. 25, 1999

(65) Prior Publication Data

US 2002/0106784 A1 Aug. 8, 2002

(30) Foreign Application Priority Data

Feb. 26, 1998 (IT) .......................................... MI98A0393

(51) Int. Cl.$^7$ ............................ B09B 3/00; C07F 11/08; C07G 17/00; C12W 1/00; C12W 1/20
(52) U.S. Cl. ............................... 435/262.5; 71/6; 71/8; 71/9; 71/11; 435/252.1; 435/267; 435/822; 435/831; 435/832; 435/834; 435/838; 435/839; 435/853; 435/854; 435/855; 435/856; 435/857; 435/878; 435/886; 435/898; 435/904; 435/911; 435/921; 435/942
(58) Field of Search .............................. 435/262.5, 822, 435/252.1, 267, 831–832, 834, 838–839, 853–857, 878, 886, 898, 904, 911, 921, 942; 71/6, 8, 9, 11

(56) References Cited

U.S. PATENT DOCUMENTS 5,503,647 A * 4/1996 Dahlberg et al. ............. 47/1.1
5,810,903 A * 9/1998 Branconnier et al. ............ 71/9

* cited by examiner

*Primary Examiner*—David M. Naff
*Assistant Examiner*—Deborah K. Ware
(74) *Attorney, Agent, or Firm*—Guido Modiano; Albert Josif; Daniel O'Byrne

(57) ABSTRACT

A method for converting organic solid waste into humic products and the corresponding apparatus, in which a preliminary aerobic fermentation of the organic solid waste is performed, followed by a second aerobic fermentation of the organic waste in the presence of specific microorganisms in order to provide a basic precursor on which the selective metabolization occurs of specific bacterial strains to provide the humic product.

3 Claims, 1 Drawing Sheet

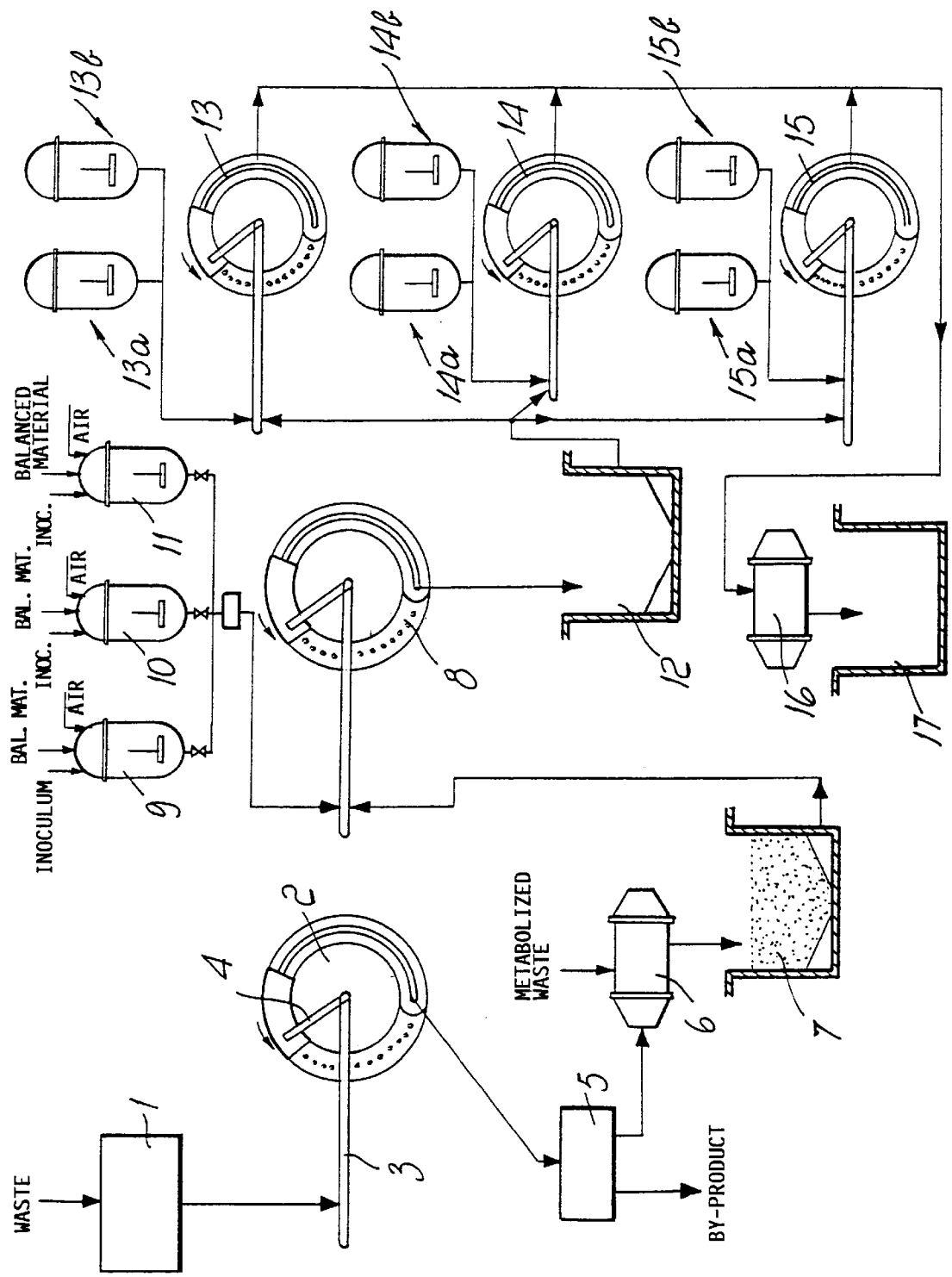

CONVERSION OF ORGANIC WASTE INTO HUMIC PRODUCTS USING MULTIPLE AEROBIC FERMENTATIONS FOR SOILS RESTORATION

BACKGROUND OF THE INVENTION

The present invention relates to a method and an apparatus for the conversion of organic solid waste into humic products.

More specifically, the present invention relates to a process for converting solid organic waste into humic products useful in the pedological restoration of agricultural soils.

A review of the state of health of agricultural soils currently forces the need to produce compounds which are capable of restoring the characteristics required for their use.

The indiscriminate use of pesticides, herbicides, fungicides, plant protection products, intensive single-crop farming and forcedly inorganic fertilizations in fact endanger what is known in agriculture as the "agronomic health of soils".

This negative trend is partly caused by the disappearance of rotation of crops and by the ever-decreasing availability of manure as amendment.

Furthermore, the chemicals used in agriculture have contributed to the degradation of soils to such a radical extent that the use of manure alone as amendment is no longer sufficient.

While manure is an excellent organic addition in a biologically healthy soil, in current conditions and most of all due to the lack of microorganisms which are decisive in humification-dehumification processes, its introduction leads to a residue of organic substances which cannot be metabolized and therefore to an accumulation of products which imbalance the organic C/N/P ratios.

Although manure release nitrogen which can be quickly assimilated, the slow kinetics of organic phosphor and a shortage in the soil of important pectin- and cellulose-lysing bacteria leads to infestation by seeds that were not digested by the animals and are found substantially intact in the manure.

One of the proposed solutions for dealing with this situation is the use of compost; however, in addition to biological anomalies, compost has shortcomings on an agricultural level, such as:

1. unbalanced C/N ratio;
2. the presence of nondegraded seeds which accordingly infest the cultivations for which the compost is designed;
3. the presence of nondegraded macromolecules, owing to the absence, in the epiphytic microflora, of microorganisms of the humification process;
4. a substantial modification of mineral colloids, with an increase in sodium silicates and consequent loss of the flocculating power of the soil and conversion of said soil into a silty compact soil which can be washed away and allows limited water penetration;
5. an increase in toughness, difficulty in tilling, compression of the surface layer and therefore compactness even in deep layers (below 25–30 cm).

In such conditions, humus becomes considerably important, since from the chemical-agricultural point of view its richness in nitrogen makes it an important element for treating agricultural soils; furthermore, above all the protective flocculating action that humic acids have on inorganic colloids is important, favorably modifying the toughness, porosity, permeability, aeration and water-holding capacity of the soil and accordingly improving what is known in agriculture as the "agronomic health" of the soil.

In order to better comprehend the nature of the humic product that can be obtained with the method according to the present invention, it is noted that the common characteristics of various types of humic extracts of various origin can be summarized as follows:

1. a polypeptide structure bonded to lignin and containing microelements such as calcium, magnesium, zinc and aluminum;
2. a well-defined microbial range in a balanced ratio in which bacteria predominate with precise qualitative and quantitative ratios with hyphomycetes, zygosaccharomycetes, algae and protozoa;
3. the presence of fatty acids, plant hormones, phosphorylated compounds, amino acids, vitamins etcetera is closely dependent on the overall anabolic and catabolic metabolic process of the microbial mass of the core of the humus.

In order to obtain a good humus, the necessary biological operations are substantially as follows:

tyndallization. This operation tends to activate, by a microbiological pathway, the thermophilic epiphytic biomasses so that their exothermic activity leads to a temperature increase which is used to destroy parasites, their eggs and microbial sporae (these last only in particular conditions);

preparation of the basic precursor on which the characteristic biomasses of the humic core are to be seeded;

selective metabolization of certain bacterial strains. This metabolization consists in biofermentations which are performed in order to prepare:

components of the humic group (fulvic acid, crenic and apocrenic acid, sacculmic acid, etcetera)

microorganisms typical of mycorrhizae plant hormones microorganisms against plant infections and for soil decontamination.

A humus adapted for a pedological restoration treatment can be characterized by means of the following properties:

the essential component is a lignin proteinate of a metal, preferably magnesium;

the C/N ratio must oscillate between 9 and 12;

the nitrogen must be spread in a balanced manner between quick-assimilation nitrogen (ammoniacal N), medium-assimilation nitrogen (amide N) and slow-assimilation nitrogen (protein N).

Conventional processes for converting organic waste into humic products have turned out to be disadvantageous owing to the large number of stages and to their discontinuous operation linked to high energy costs and operating times.

SUMMARY OF THE INVENTION

One of the aims of the present invention is to provide a method and an apparatus which allow to produce a humic product which is adapted for pedological conversion and restoration of agricultural soils.

An object of the present invention is to provide a method of the above type whose initial material is constituted by waste products which are otherwise difficult to dispose of from the ecological point of view, such as for example waste from zootechnical farms, agri-foodstuff industries, or MSW.

Another object of the present invention is to provide a method and an apparatus which operate continuously shorter times and lower energy costs.

This aim, these objects and others which will become apparent hereinafter are achieved by a method for converting organic solid waste into humic products, comprising a preliminary aerobic fermentation of the material to be processed and a second aerobic fermentation of said material in the presence of specific microorganisms in order to provide a basic precursor on which the selective metabolization occurs of specific bacterial strains to provide the humic product.

BRIEF DESCRIPTION OF THE DRAWINGS

Further characteristics and advantages of the present invention will become apparent from the following detailed description of a specific embodiment of the method according to the present invention, illustrated only by way of non-limitative example with reference to the accompanying drawing, which is a flowchart of the process.

DESCRIPTION OF THE PREFERRED EMBODIMENTS

Solid waste from various sources can be used as initial materials in the process according to the present invention; more specifically:

a. municipal solid waste, as well as hospital waste or other similar waste;

b. organic waste of fruit and vegetable markets and canning and food industries;

c. waste of slaughterhouses, solid waste from intensive livestock rearing and solid residues from dairies, etcetera;

d. sludge resulting from the treatment of wastewater.

The initial solid waste, if it is of the type that requires mechanized sorting (for example waste of the above defined type a), taken as a whole or individually, is subjected to a mechanized sorting process in (1), simply tearing the containers without thorough grinding.

The organic part is then sent to a tunnel (2) where aerobic fermentation occurs by triggering the thermophilic epiphytic microflora that is naturally present. The process is performed by injecting air into the vegetable piles without balancing the nutritional ratios: the microflorae, by activating exothermic biochemical reactions, cause an increase in temperature and a consequent sterilization of the piles with respect to certain infesting species (tyndallization stage).

In addition to eliminating eggs, parasites and larvae, this stage of the process according to the invention has the goal of destroying sporogenous microorganisms (such as for example Clostridium tetani, gas-gangrene Clostridium, Clostridium botulinum) which can remain inactive and latent for as long as thirty years.

In order to allow the tyndallization stage to be effective for the above purposes, it must be performed for a first period lasting 5–15 days, preferably 8–12 days, at 30–100° C., preferably 60–70° C., then stopping the process for 4–6 days and resuming thermophilic metabolization for another 515 days, preferably 8–10 days.

The biotunnel (2) turns counterclockwise and is controlled by an extractor intake which operates in step with the distributing bridge crane. In this manner, the amount of material extracted is identical to the amount divided into piles and the apparatus operates continuously.

The tyndallization stage is preferably followed by a second screening in (5) in order to eliminate any trace of waste that has not already been sorted, such as small glass pieces and light screening rejects.

The organic substances arriving from screening in (5) are mixed with additional waste which does not contain inorganic or nonmetabolized parts and therefore does not require sorting. Then an analytical evaluation of the mixed waste is performed to evaluate the following parameters:

C/N/P ratio pH humidity (at 105° C., 60 min)

After the analyses have ended, the following corrections are performed, for example in the mixer (6).

a. C:N:P ratio. Taking 100 to represent the carbon found during analysis, the ratio is brought to approximately 100: (30–5):(10–1). For nitrogen correction it is possible to use ammonium sulfate, urea, ammonium nitrate and ammonia in a 10% acqueous solution. For the phosphate it is possible to use dicalcium phosphate, ammonium phosphate, monopotassium phosphate. Triammonium phosphate and ammonia are in any case preferred.

b. pH correction. The pH is brought to an acid value, preferably to an optimum value between 5.9 and 6.7; it is possible to use 10% ammonia for subacid pH values and 5% phosphoric acid for subalkaline pH values. The pH can be corrected and maintained with any basic or acid product comprising organic and/or inorganic bases and acids.

c. any correction of humidity to values between 40% and 80%, preferably between 55% and 65%, for example by sending onto the piles of waste percolates from the storage step, provided for each fermentation tunnel.

The balanced waste, collected in a storage step (7), is sent to an aerobic fermentation stage, to macromolecular degradation and to the production of bacterial protein in the biotunnel (8). Here, in addition to the waste taken from (7), microorganisms are seeded which are chosen among heterotrophic and homeofermenting bacteria, cultures of which are prepared in agitated and aerated reactors with adapted inoculations, together with substances for balancing the C/N/P ratios (depending on the specific conditions).

The piles are areated by means of bottom-up air injection with pH and humidity control; humidity is maintained by sending onto the piles the percolates of the waste originating from the storage pits (not shown); the system is organized so as to have a retention time of 18–20 days.

Microbial seedings originate both from the continuous fermentation reactors and by partial return of the fermented material (not shown in the flowchart); this occurs in order to always have cell renewal and force the material to always metabolize at the peak of the growth curve.

The strains mentioned in the present description are designated by the ATCC code number.

In the embodiment illustrated in the drawing, cultures of at least one of the following strains are prepared in a first reactor (9):

Bacillus polymyxa strain 21551
Bacillus polymyxa strain 21993
Bacillus sp. strains 14177 31505
Bacillus subtilis strain 21663
Agrobacterium sp. strain 21400.

The use of a mixture thereof is preferred.

At least one of the following strains is seeded in a second reactor (10):

Cellulomonas sp. strain 21399
Bacillus mycoides and Bacillus tetraultii strains 19647 and 19646
Bacillus subtilis strain 21663.

The use of a mixture thereof is preferred.

At least one of the following strains is seeded in a third reactor (11):

Lactobacillus acidophilus strain 33199
Lactobacillus casei strain 7469
Candida sp. strain 20200
Candida sp. strain 24565
Labyrinthula sp. strain 24561

*Rhodotorula glutinis* strain 20310
*Rhodotorula glutinis* strain 36575.
The use of a mixture thereof is preferred.

Alternatively, at least one of the following microbial strains, can be cultivated in the reactors (9), (10) and (11):
*Bacillus polymyxa* strains 12712 10401
*Bacillus* sp. strains 21536 21537 21591 21592 21594 31408 31507
*Bacillus subtilis* strain 7058
*Bacillus mycoides* strains 31101 31102 31103
*Lactobacillus amylovorus* strains 33620 33622
*Lactobacillus brevis* strain 8287
*Lactobacillus delbruekii* strain 9649
*Lactobacillus casei* strains 9595 10863
*Lactobacillus plantarum* strain 8014 39268
*Saccharomyces cerevisiae* strains 42600 7752 9080
*Candida utilis* strains 9226 9255 26837 60459 20401 32113
*Yarrowia lipolytica* strains 8661 8662 20297 20341 20348 20362 20363 20364 34922 46482 46483 46484 and also bacteria strains 6918 21160.
The use of a mixture thereof is preferred.

The strains mentioned in the present description are advantageously available in lyophilici form.

Said reactors are equipped with all the monitoring instruments (pH, rH, dissolved O2, temperature, turbidimeters, etcetera).

In this biotunnel, as in all the others used in this method, fermented material is extracted with a flow-rate which is equal to the input flow-rate, so as to provide continuous operation.

Once fermentation has completed, a product which is rich in protein, up to 40% on the dry product, is obtained; this product, suitably homogenized, is sent to a storage pit (12). The material is removed and sent to fermentations in three biotunnels after mixing in mixers for example of the oscillating screw feeder type (not shown).

This stage is organized according to the illustrated embodiment: 25% of the total product, fed in (13), is seeded with a microbial mass of polyphenol oxidase strains and biocides. 25% of the total product, fed in (14), is seeded with hormone-producing strains and new biocidal bacteria. Finally, 25% of the total product, fed in (15), is seeded with plant kingdom symbiont strains.

In particular, the material in (13) receives the addition, in the amount of 5% by weight, of wood sawdust and is seeded by the cultures that arrive from:
Reactor (13a), polyphenol oxidase strains:
*Fomes fomentarius* strain 34687
*Oidiodendron echinulatum* strain 16287
*Trametes versicolor* strain 32745;
Reactor (13b), biocidal strains:
*Streptomyces argenteolus* strain 11009
*Streptomyces* sp. strain 21001
*Streptomyces rameus* strain 21273
*Bacillus cereus* strains 21281 and 21282
*Streptomyces hygroscopicus* strain 31955
Unidentified bacteria strains 25244 and 25246

In the biotunnel (14), the material receives the addition, without pH correction, of 3% sawdust and is seeded with cultures arriving from:
Reactor (14a), hormone-producing strains:
*Eupenicillium brefeldianum* strain 10417
*Pisolithus tinctorius* strain 38054
*Saccharomyces cerevisiae* strain 9080
*Giberella Fujikuroi* strains 12616 and 14164
*Canarops microspora* strain 46269
*Schizosaccharomyces pombe* strain 20130
*Taphrina betulina* strain 34554
*Taphrina populina* strain 34560;
Reactor (14b), biocidal strains:
*Mycobacterium smegmatis* strain 21732
*Gliocladium catenulatum* strain 52622
*Trametes albida* strain 20119
*Byssochlamys fulva* strain 28799
*Cephalosporium pimprina* strain 16541

In the biotunnel (15), the material, after pH correction to values between 6 and 9, preferably between 7.4 and 7.8, by means of 5% ammonium hydrate, is added to 0.2 g/kg of K2HPO4, 0.2 g/kg MgSO4.7H20, 0.1 g/kg CaSO4.2H20, and then seeded by cultures from:
Reactor (15a), nitrogen-fixing strains:
*Azotobacter Chroococcum* strain 480
*Azotobacter vinelandii* strain 478
*Rhizobium* sp. strain 33848;
Reactor (15b), symbiont root strains:
*Rhizobium leguminosarum* strain 14482
*Rhizobium loti* strain 33669
*Rhizobium meliloti* strain 9930

The three tunnels (13), (14) and (15) provide aeration to the piles by means of bottom-up air injection with pH and humidity control; humidity is maintained by sending onto said piles the percolates of the waste from the storage pits (not shown); the system is organized so as to have a retention time of 18–20 days.

Microbial seedings occur both from the continuous fermentation reactors and by partial return of the fermented material (not shown in the flowchart), in order to always have cell renewal and to force the material to always metabolize at the peak of its growth curve.

The material is taken, for example by milling, and sent to a continuous mixer (16) which adds the remaining fraction (25%), which arrives from protein fermentation in (8) and from the storage pit (12).

The resulting material can be stored loose in (17) and has a validity of up to 24 months. It contains the entire range of microorganisms of the humic core, no less than 60% humus and has perfect balancing in its C/N/P ratios, which makes it adapted for restoring the fertility of impoverished and/or sterile soils.

The seeding of the strains inside the various fermentation reactors occurs once every 10–12 months from the beginning of the operation of the plant in order to allow cell renewal and optimize the process.

Strains described in the present invention are also applied in the recovery of infested and poisoned soils: this application is the subject of another patent application in the name of the same Applicant.

The method according to the invention is susceptible of numerous modifications and variations, all of which are within the scope of the inventive concept; the details of the method and the described devices may furthermore be replaced with technically equivalent elements.

The materials used to build said devices, and their dimensions, may of course be modified according to the requirements and the state of the art.

The application of the described apparatus is also proposed in a multifunctional platform, since in such an environment it may interact with other technologies, thus completing the recovery of solid waste, improving the obtainable secondary raw materials and at the same time minimizing the use of landfills and incinerators.

A multifunctional platform for the treatment of MSW and the like which is adapted for the method according to the invention comprises the following parts:
1. mechanized sorting which meets the various requirements of the specific case;
2. a controlled metabolization of the organic parts, performed in a biotunnel with automatic process control;
3. controlled pyrolysis to produce pyrolytic gasolines and pyrolytic coal from polymeric products;

4. a methane-based apparatus with methanization processes for processing organic wastewater which cannot be used to produce humus because it is rich in heavy metals (sewer sludge, street-sweeper trash, etcetera).

What is claimed is:

1. A method for converting organic solid waste into humic products, comprising:
   1) in a first stage, tyndallizing said organic solid waste by administering air by injecting air, such that thermophilic epiphytic microfibers naturally occurring in said organic solid waste activates exothermic biochemical reactions causing a substantial redaction of microorganisms infesting the organic solid waste to produce a first product;
   2) in a second stage, selectively carrying out aerobic fermentation by seeding the product from the first stage with a microorganism selected from the group consisting of heterotrophic bacteria, homeofermenting bacteria and mixtures thereof, to achieve degradation and bacteria protein to form a second product rich in protein;
   3) in a third stage, selectively carrying out aerobic fermentation by seeding the product rich in protein from the second stage with a polyphenol oxidase microorganism strain to form a third product;
   4) in a fourth stage, selectively carrying out aerobic fermentation by seeding the product from the third stage with a microorganism selected from the group consisting of hormone-producing strains, biocidal bacteria and mixtures thereof to form a fourth product; and
   5) in a fifth stage, selectively carrying out aerobic fermentation by seeding the product from the fourth stage with a microorganism selected from the group consisting of plant kingdom symbiont microorganism strains, nitrogen-fixing strains and mixtures thereof to provide said humic products.

2. The method according to claim 1, wherein said tyndallizing comprises heating the organic solid waste at a temperature in a range of 30–100° for 5–15 days, stopping the heating and injecting air for 4–6 days and then further resuming said heating and injecting air for 5–15 days.

3. The method according claim 1, wherein the first through the fifth stages are performed in biotunnels.

* * * * *